(12) United States Patent
Janik et al.

(10) Patent No.: US 11,821,558 B2
(45) Date of Patent: Nov. 21, 2023

(54) FLUID CONNECTOR WITH DRY BREAK

(71) Applicant: COOPER-STANDARD AUTOMOTIVE INC, Northville, MI (US)

(72) Inventors: Arthur Janik, Offersheim (DE); Stephen S. Frederiksen, Clarkston, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/874,558

(22) Filed: Jul. 27, 2022

(65) Prior Publication Data
US 2023/0071590 A1    Mar. 9, 2023

Related U.S. Application Data

(60) Provisional application No. 63/241,652, filed on Sep. 8, 2021.

(51) Int. Cl.
*F16L 37/40*    (2006.01)
*F16L 37/14*    (2006.01)

(52) U.S. Cl.
CPC ............ *F16L 37/40* (2013.01); *F16L 37/144* (2013.01)

(58) Field of Classification Search
CPC ....... F16L 37/40; F16L 37/38; F16L 37/0885; F16L 37/088; F16L 37/144; F16L 37/142
See application file for complete search history.

(56) References Cited

U.S. PATENT DOCUMENTS

| | | | | |
|---|---|---|---|---|
| 2,383,249 A | * | 8/1945 | Hardwick | F16L 37/252 251/149.5 |
| 3,199,831 A | * | 8/1965 | Sully | E03B 9/08 277/648 |
| 3,566,918 A | * | 3/1971 | Rauen | F16L 37/42 137/614.04 |
| 4,278,276 A | * | 7/1981 | Ekman | F16L 37/0885 285/388 |
| 4,660,804 A | * | 4/1987 | Liu | F16L 37/113 251/149.6 |
| 5,560,548 A | * | 10/1996 | Mueller | B05B 1/1663 4/615 |
| 6,318,764 B1 | * | 11/2001 | Trede | F16L 37/144 285/308 |
| 6,520,480 B2 | | 2/2003 | Martin-Cocher et al. | |

(Continued)

FOREIGN PATENT DOCUMENTS

DE    202007011307 U1    12/2007

OTHER PUBLICATIONS

Search Report and Written Opinion for 22194285.7 dated Feb. 17, 2023.

*Primary Examiner* — David Colon-Morales
(74) *Attorney, Agent, or Firm* — James C. Paschall; Paschall & Associates, LLC

(57) ABSTRACT

A quick connector and connector body comprises a coupler portion having a fluid passage connected to a first fluid tube. A valve mounted within the fluid passage is movable between a closed and an open position. A receptacle portion coupled to the coupler portion includes a socket cavity adapted to receive a second fluid tube within the socket cavity that causes the valve to move into the open position allowing fluid to flow through the fluid passage from the first fluid tube to the second fluid tube.

12 Claims, 7 Drawing Sheets

(56) References Cited

U.S. PATENT DOCUMENTS

| | | | |
|---|---|---|---|
| 6,892,999 B2 | 5/2005 | Hall et al. | |
| 7,311,231 B2* | 12/2007 | Noell | A45F 3/20 |
| | | | 215/388 |
| 7,393,019 B2* | 7/2008 | Taga | F16L 37/0885 |
| | | | 285/321 |
| 7,699,290 B2* | 4/2010 | Chang | F16K 15/1821 |
| | | | 285/317 |
| 8,191,932 B2* | 6/2012 | Davis | F16L 37/23 |
| | | | 285/277 |
| 8,646,811 B1* | 2/2014 | Chang | F16L 37/23 |
| | | | 285/1 |
| 9,188,267 B2* | 11/2015 | Fansler | F16L 37/144 |
| 9,611,964 B2* | 4/2017 | Nezu | F16L 37/0885 |
| 9,969,242 B2* | 5/2018 | Kesler | F16K 1/422 |
| 10,125,908 B2* | 11/2018 | Kujawski, Jr. | F16L 37/0885 |
| 11,168,819 B2* | 11/2021 | Gaudiau | F16L 37/144 |
| 11,174,974 B1* | 11/2021 | Jiang | F16L 37/40 |
| 11,187,364 B2 | 11/2021 | Jin et al. | |
| 11,204,120 B2* | 12/2021 | Burdge | F16L 37/42 |
| 2005/0101939 A1* | 5/2005 | Mitchell | A61M 39/26 |
| | | | 604/533 |
| 2016/0238173 A1 | 8/2016 | Kujawski, Jr. et al. | |
| 2019/0242510 A1* | 8/2019 | Klein | F16L 37/0985 |
| 2020/0378539 A1* | 12/2020 | Ruopp | F16L 37/40 |
| 2022/0074529 A1* | 3/2022 | Que | F16L 37/144 |

\* cited by examiner

FLUID CONNECTOR WITH DRY BREAK

CROSS-REFERENCE TO RELATED APPLICATIONS

This application claims priority under 35 U.S.C. § 119(e) to U.S. Provisional Patent Application No. 63/241,652 filed on Sep. 8, 2021. This provisional application is hereby incorporated by reference in its entirety.

TECHNICAL FIELD

This disclosure is generally directed to fluid connectors. More specifically, it relates to a fluid connector that receives a fluid tube into a connector body that permits fluid to flow through the connector body to the fluid tube and that breaks the fluid flow when the fluid tube is removed.

BACKGROUND

In fluid piping in which a tube, such as a pipe or a hose, is joined to another device such as a pump, tank or another tube, a coupling connector may be used for joining the tube to the other device. Disconnect couplings, such as for example, quick connectors are frequently used for joining a tube to another device. The quick connector may also include an automatic device that shuts-off or breaks the flow of fluid when the mating parts of the quick connector are disengaged. Quick connectors are typically comprised of two primary components or member, a receptacle having an axial fluid-flow pathway configured to be attached to a fluid supply tube, and a plug or endform having an axial fluid-flow pathway through the endform configured or attached to another fluid receiving tube. The endform arranged to be inserted into the receptacle to join the two fluid tubes and to create a single fluid-flow pathway between the tubes.

Valve devices may be included in the fluid flow pathway to stop the fluid flow when the endform is disengaged from the coupled relationship. Conventional dry break or poppet valves are typically permanently mounted within, or are an integral component of, a valve module installed in the connector receptacle in the fluid flow pathway. Assembly of a non-integrated valve into a receptacle is often difficult given the number of components needed to be positioned precisely and accurately in a relatively small space. Accordingly, there is a need for an improved valve design for fluid connectors having dry break valves that can reduce the costs and complexity of assembling and using a dry break in a quick connector.

SUMMARY

This disclosure relates to a fluid connector that receives a fluid tube into a connector body that permits fluid to flow through the connector body to the fluid tube and that breaks the fluid flow when the fluid tube is removed.

In a first embodiment, a connector body is disclosed that comprises a coupler portion having a fluid passage connected to a first fluid tube. A valve mounted within the fluid passage is movable between a closed and an open position. A receptacle portion coupled to the coupler portion includes a socket cavity adapted to receive a second fluid tube within the socket cavity that causes the valve to move into the open position allowing fluid to flow through the fluid passage from the first fluid tube to the second fluid tube.

In a second embodiment, a quick connector for coupling a first fluid tube to a second fluid tube is disclosed. The quick connector comprises a coupler portion having a fluid passage connected to the first fluid tube. A valve mounted within the fluid passage is movable between a closed position and an open position. An endform having a fluid passage is formed on an end of the second fluid tube. The endform is adapted to be installed in a socket cavity of a receptacle portion of the quick connector causing the valve to move into an open position that allows fluid to flow through the fluid passage from the first fluid tube to the endform fluid passage.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
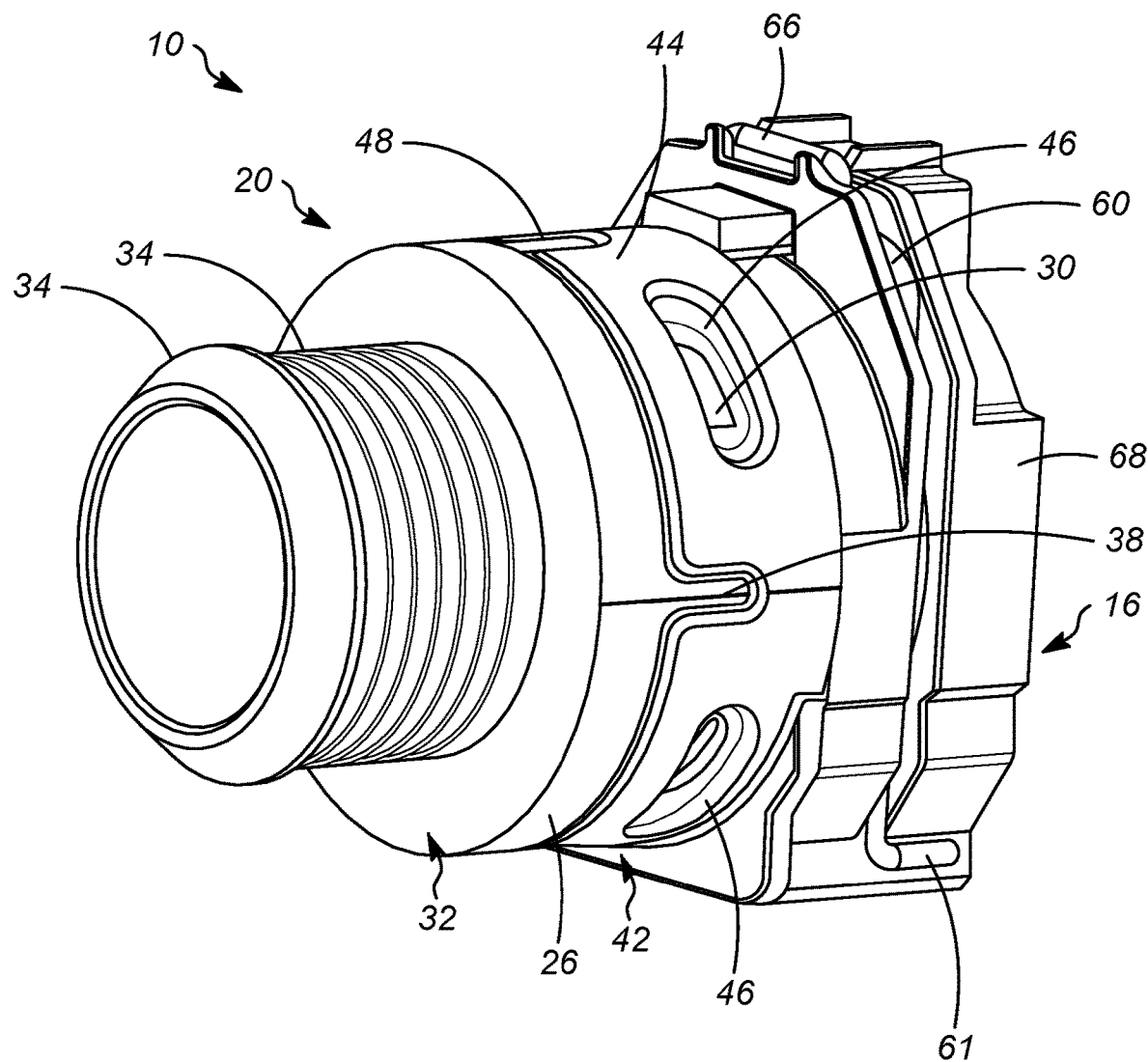
FIG. 1 is an isometric view of the connector body according to this disclosure.

All figures serve illustrative purposes only and are not intended to limit the scope of the present invention. The drawings are generally to scale, but some features may not be true to scale and serve to emphasize certain details of the various aspects of the invention. Common items between different embodiments of the figures have common reference numerals. It should be noted that for purposes of clarity, the quick connector of the present disclosure is shown with its longitudinal extent position in a horizontal plane and the terms "top," "bottom," have been used in describing the connector body. However, in use, the quick connector coupling can reside in any orientation without regard to the horizontal and vertical planes and "top," "bottom," "sides," and "lateral" are thus used in relation to the figures and illustrations herein.

Reference numeral 10 in FIGS. 1-7 illustrate an example quick connector body 10 for coupling a second fluid tube (not shown) to a first fluid tube 54, (shown in FIG. 5) or to a fitting mounted to a device. The connector body 10 is comprised of a receptacle portion 16 located one end of the connector body 10 and a coupler portion 20 on another end of the connector body 10 in axial alignment with the other. The coupler portion 20 includes a male stem 32 arranged to be inserted within the first fluid tube 54. The male stem 32 includes one or more barbed flanges 34 having saw-tooth cross sections designed to bite into the inner surface of the first fluid tube to retain the first fluid tube 54 to male stem 32 and make a fluid seal between the first fluid tube 54 and the coupler portion 20.

Figure 5:
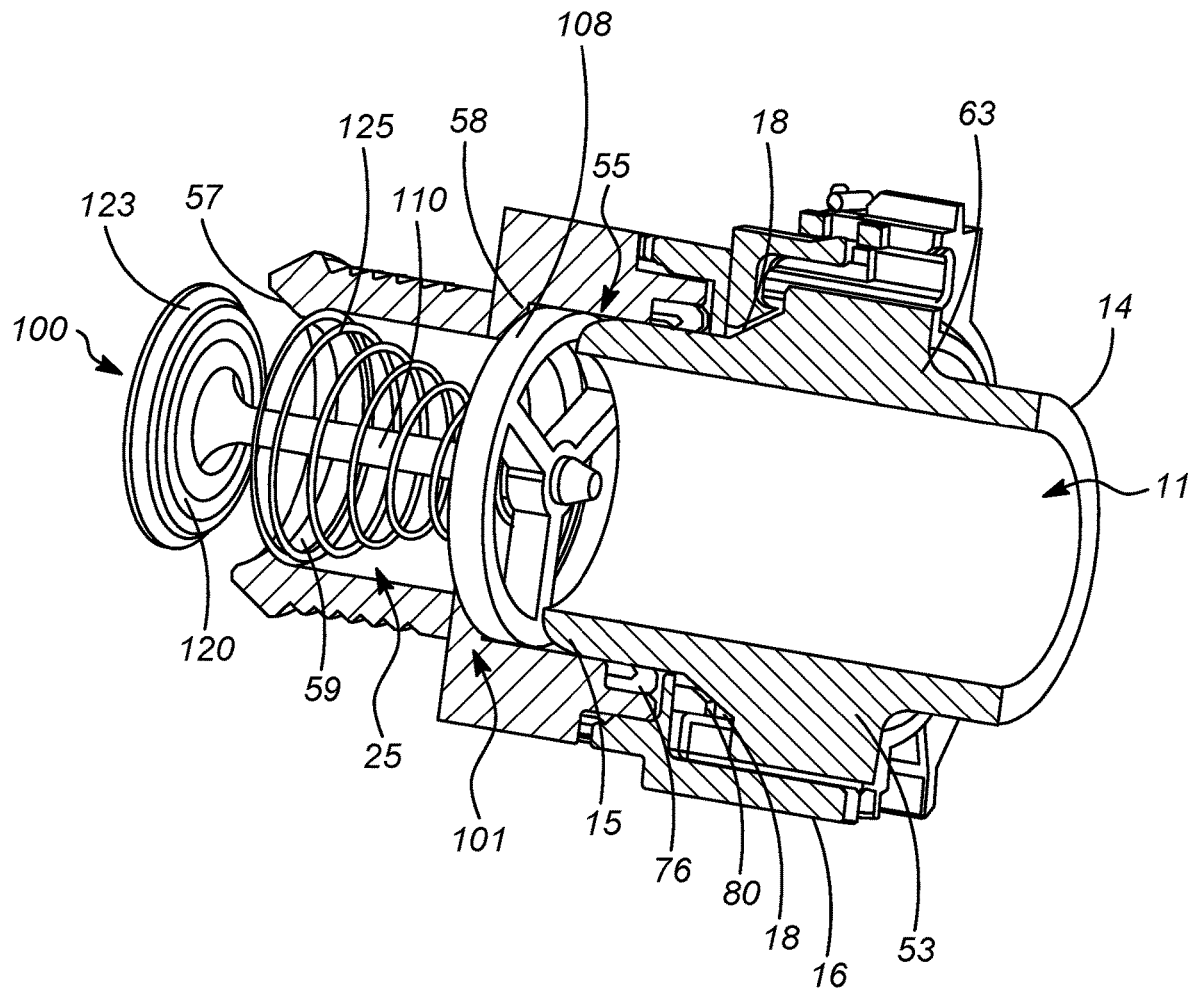
FIG. 5 is an isometric sectional view of the connector body with an endform installed in the socket cavity according to this disclosure.
Figure 6:
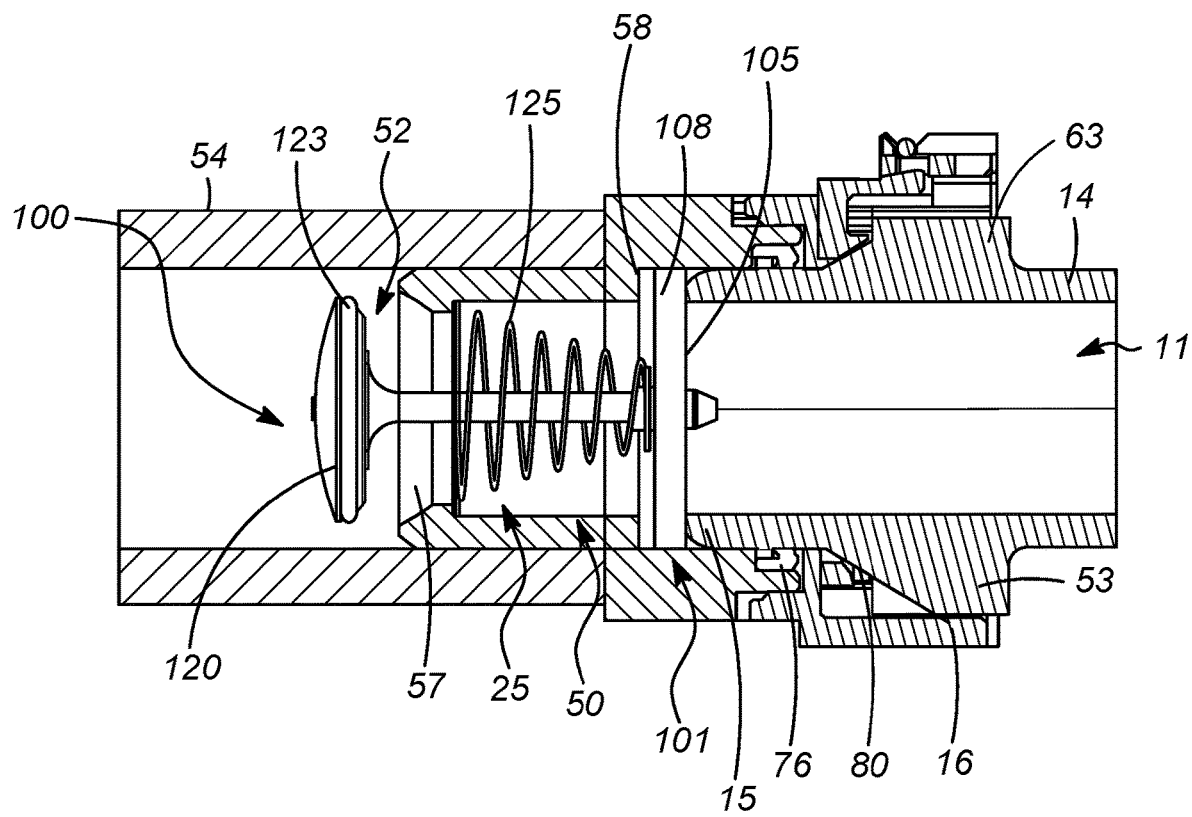
FIG. 6 is a longitudinal sectional view of the connector body with an endform installed in the socket cavity and a tube installed on the coupler portion of the connector body according to this disclosure.

The receptacle portion 16 includes a tubular socket cavity 72 on a first end of the receptacle 16 adapted to receive an endform formed on the end of a second tube, such as endform 14 illustrated at FIGS. 5 and 6. The tubular endform 14 extends from an insertion end 15 and is shaped and sized to be accepted and locked within the socket cavity 72, which will be explained in more detail below. The receptacle portion 16 further includes a mating end 42 with an annular outer wall 44 extending about the periphery of the mating end 42. A plurality of openings 46 are located about on the outer wall 44 of mating end 42. Each opening 46 extending through the outer wall 44 from the exterior to the interior of the wall 44. Additionally, the outer wall 44 includes a plurality of projection receivers 48 adapted to receive therein an associated projection 38 when the receptacle portion 16 is installed to the coupler portion 20.

The coupler portion 20 includes a cylindrical fluid passage 25 that receives the insertion end 15 of the endform 14. Specifically, the fluid passage 25 may receive the insertion end 15 of the endform 14 within the fluid passage 25. The coupler portion 20 further includes a cylindrical outer surface 26 that extends about the periphery of the coupler 20. A latch 30 may be fashioned on the outer surface 26. In an aspect, a plurality of latches 30 may be fashioned on the outer surface 26. The latches may be rectangularly shaped and include a chamfered surface that extends obliquely outward from outer surface 26.

The endform 14 shown at FIGS. 5 and 6 includes a fluid passage 11 extending through insertion end 15 to the second fluid tube. The endform may also include a groove (not shown) that extends radially about the endform 14 and first and second indexing tabs 63 and 53, respectively located on and extending from the endform 14 from opposite sides of the endform 14. The first indexing tab 63 is arranged to be received in a first groove 65 located in receptacle portion 16 and the second indexing tab 53 into a second groove 55 located on an opposite side of receptacle portion 16. Tabs 63 and 53 provide and ensure alignment of the endform 14 to the receptacle portion 16 when insertion end 15 is inserted into socket cavity 72.

The mating end 42 of receptacle portion 16 is arranged to be inserted over the surface 26 of the coupler portion 20. The mating of the coupler portion 20 to receptacle portion 16 is made by aligning a projection 38 with an associated projection receiver 48 and the receptacle portion 16 forced forward to allow the chamfered portions of latches 30 to ride against the inside surface of the outer annular wall 44 until they are received within an associated opening 46 and make a snap-fit connection within a respective opening 46 latching the receptacle portion 16 to coupler portion 20. The coupler 20 can also be removed from the receptacle portion 16 by forcing latches 30 out of openings 46 and pulling the coupler portion 20 from the receptacle portion 16. The coupler portion 20 and the receptacle portion 16 may be separately constructed from a resin or molded from a thermoplastic material such as polyamide or polyphthalamide.

The receptacle portion 16 includes a wire retainer 60 embracing the receptacle portion 16. The wire retainer 60 has a u-shaped configuration comprising two opposed legs 64 extending from a bight 66. The bight 66 embraces an outer wall 68 of the receptacle portion 16, however the legs 64 extend through slots in wall 68, permitting the legs to extend into the socket cavity 72 of the receptacle 16 when the retention clip 60 is in a relaxed condition. Each of the wire legs 64 terminates in an upturned prong 61 which is assembled onto the receptacle portion 16 by passing through a slot contiguous and orthogonal to the slots in wall 68.

Figure 2:
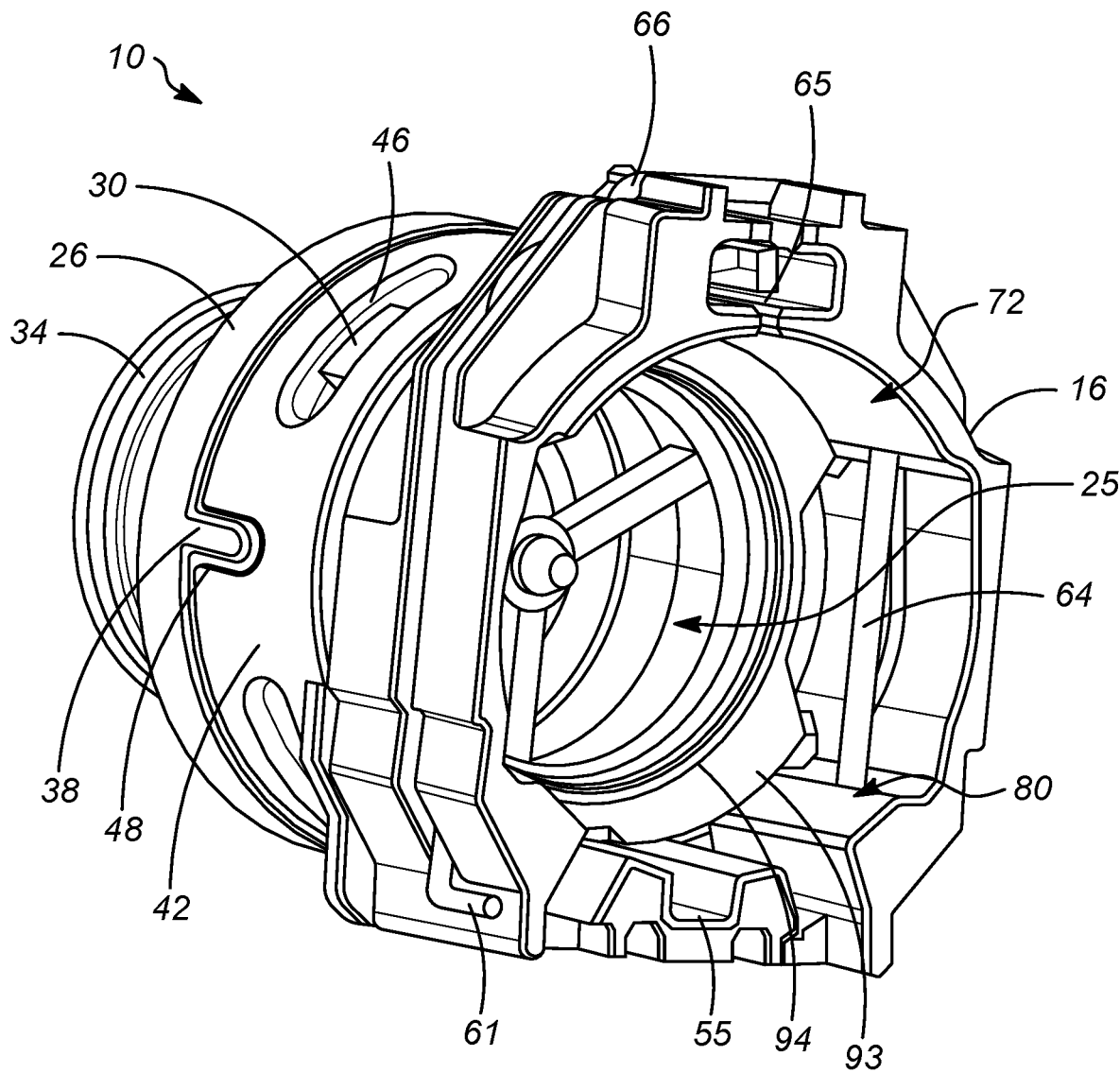
FIG. 2 is an isometric view of the connector body of FIG. 1, facing the socket cavity according to this disclosure.
Figure 3:
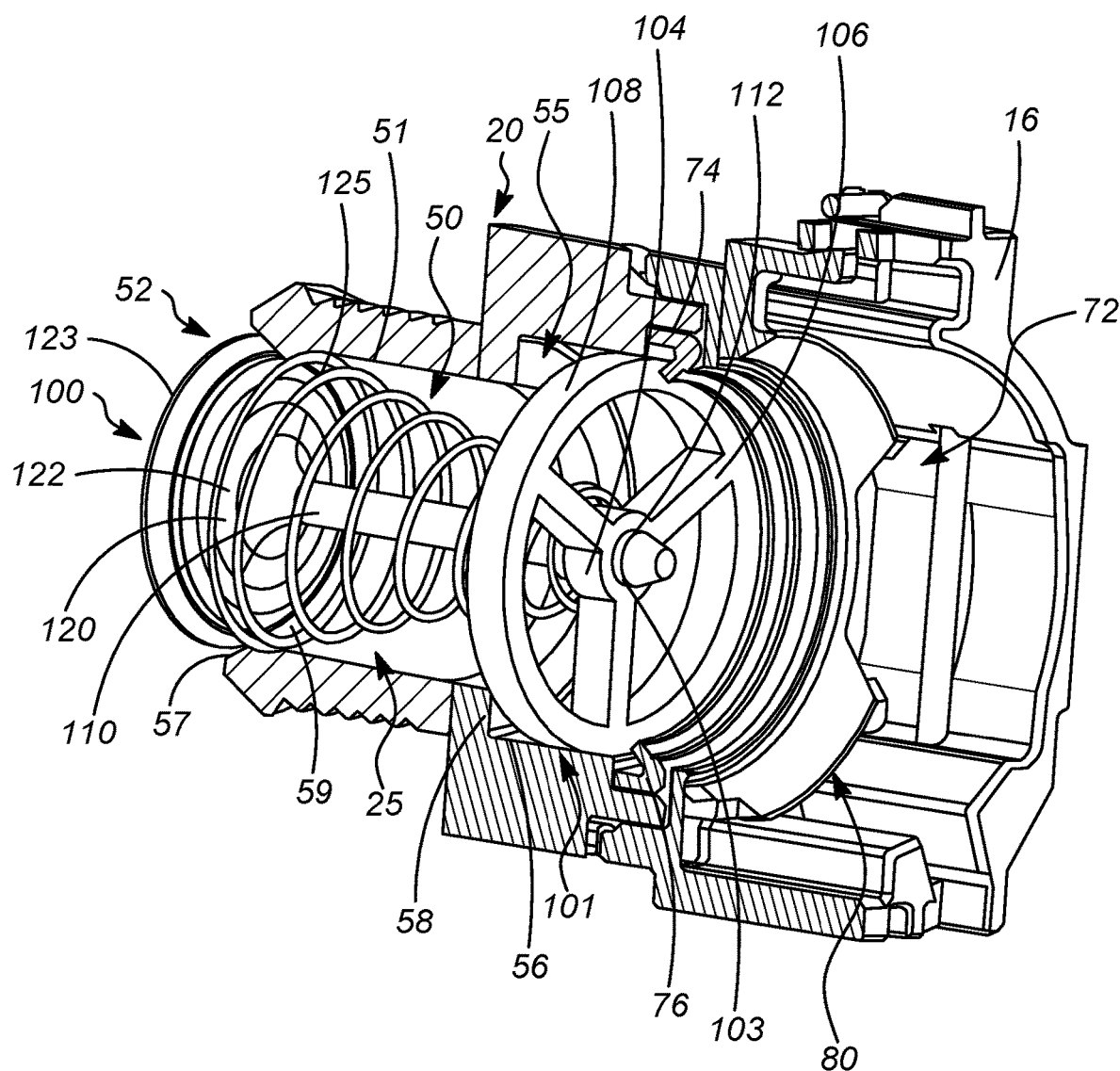
FIG. 3 is an isometric sectional view through the connector body according to this disclosure.
Figure 4:
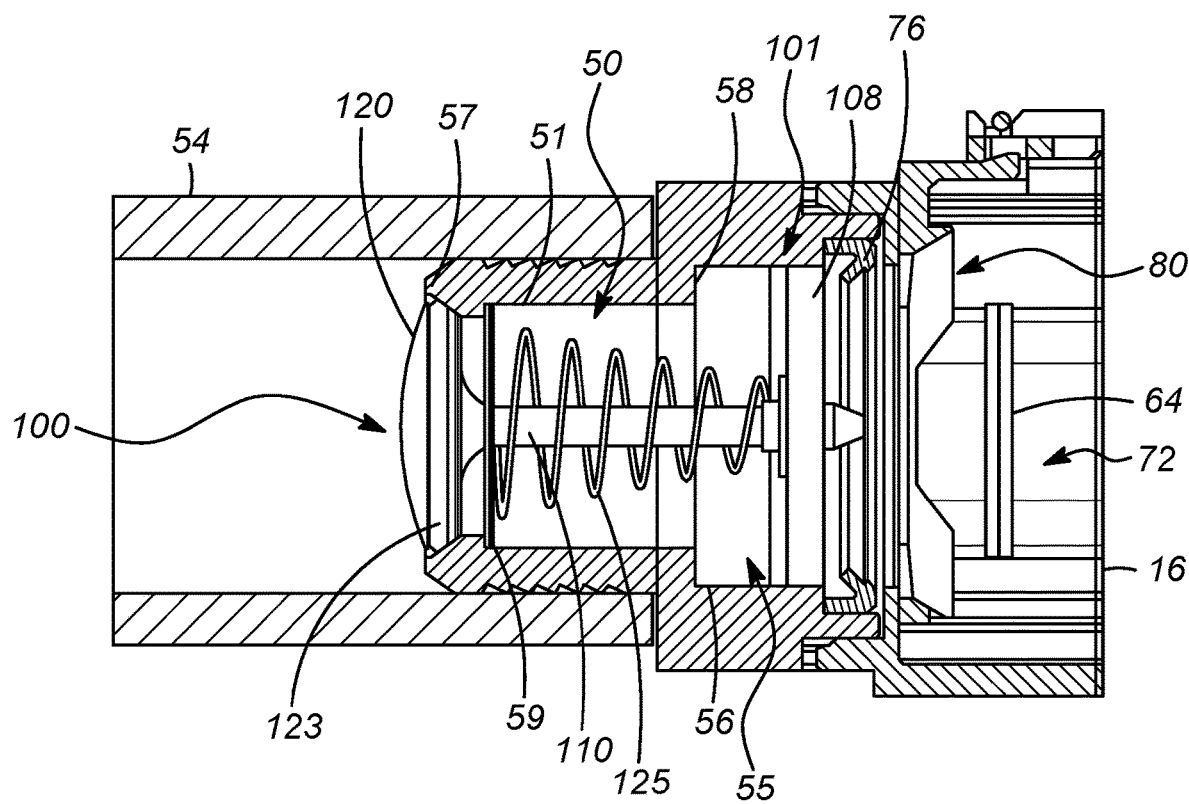
FIG. 4 is a longitudinal sectional view of the connector body including a tube installed on the coupler portion of the connector body according to this disclosure.

As illustrated in FIGS. 2-4, an endform guide member 80 is installed in the socket-cavity 72 of the receptacle portion 16. The guide member 80 has a front inclined wall that has an inner diameter and an outer diameter at a mating end 93 that is a greater diameter than an inner diameter at an engaging end 94. A similar inclined wall is located on an opposite side of guide member 80. Consequently, the inside and an outside surface of the inclined walls taper inwardly along a direction of insertion and engage tapered surfaces 18 of the endform 14, as can be seen in FIGS. 5 and 6.

The passage 25 of coupler portion 20 is defined by a first cylindrical bore 50 having a cylindrical wall 51 and a second cylindrical bore 55 having a cylindrical wall 56 as illustrated in FIGS. 3 and 4. The second cylindrical bore 55 includes an interior annular groove 74 on a first end of the cylindrical bore 55. The annular groove 74 retains therein an elastomeric sealing assembly, for example the sealing member 76. When the insertion end 15 of endform 14 is inserted into the second bore 55, sealing member 76 squeezes around the insertion end 15 and prevents leakage of fluid passing around the endform into socket cavity 72. The second bore 55 extends from the sealing member 76 at a uniform diameter to an annular stop surface 58. The first bore 50 extends axially along the coupler portion 20 fluid passage 25 from the stop surface 58 on a first end to a second annular stop surface 59 on a second end. An opening 52 having an annular chamfered surface 57 forms an annulus at the second end of the first bore 50.

A valve 100 is formed within the coupler portion 20 fluid passage 25. The valve 100 is comprised of a valve engaging member 101, a stem member 110, a domed head or poppet 120 and a spring 125. The valve 100 is movable between a closed position and an open position. In the closed position shown in FIGS. 3 and 4 the valve 100 blocks and prevents entry of fluid from the first tube 54 to fluid passage 25. In the open position, the valve opens as is shown in FIGS. 5 and 6 allowing fluid to flow from the first tube 54 into fluid passage 25 of coupler portion 20.

With renewed reference to FIGS. 3 and 4, the valve 100 components will now be discussed. The valve engaging member 101 includes an annular hub 104 having a plurality of spokes 106 extending from the hub 104 to an outer circular member 108. The spoked configuration of the valve engaging member 101 allows the flow of fluid between the spokes 106 from the second bore 55. The outer member 108 is axially movable along wall 56 of the second bore 55 between a first and a second position. The hub 104 includes an opening 103 that receives a first end 112 of stem member 110 within the opening 103. The first end 112 of the stem member 110 can be permanently fixed to the hub 104 opening 103 or may include chamfered surfaces (not shown) that allow the first end 112 to snap-fit into the opening 103. The stem member 110 extends axially from the first end 112 within the first bore 50 to a second end. The second end integrally attached to a first surface 122 of the domed head 120 at a central location of the first surface 122. The domed head 120 includes an annular groove extending along an external periphery of the domed head 120. The groove retains an elastomeric sealing member, for example an O-ring 123 therein. The spring 125 is connected between the first bore stop 59 and the hub 104 of the engaging member 101. The spring 125 biases the valve engaging member 101 into the first position in its uncompressed and relaxed condition. In the first position the stem member 110 pulls the domed head 120 O-ring 123 against chamfered surface 57 of opening 52 sealing the fluid passage 25 of the coupler portion 20 from the fluid in fluid conduit 54 placing the valve 100 in the closed position.

FIGS. 5 and 6 illustrate the valve 100 in the open position. The insertion end 15 of endform 14 is installed into receptacle portion 16 through socket cavity 72. As the endform 14 is installed in socket cavity 72 the pilot 80 guides the insertion end 15 into the second bore 55 of the coupler portion 20. A front face of the insertion end 15 engages an outer surface 105 of the valve engaging member 101. The endform 14 is pushed into the receptacle 16 until legs 64 of the retaining wires 60 enter into the groove of the endform 14 locking the endform 14 to the receptacle portion 16. The sealing member 76 deforms about the periphery of insertion end 15 making a fluid seal about the insertion end 15 of the endform 14. The front face of the insertion end 15 axially displaces the engaging member 101 towards stop surface 58 and into the second position. The stem 110 transfers the axial displacement to the domed head 120, moving the domed head 120 and disengaging O-ring 123 from the chamfered surface 57, opening the fluid passage 25 to the fluid in the second fluid tube 54. In the open position, fluid flows from the second fluid tube 54 into opening 52 through the fluid passage 25 to the fluid passage 11 of the endform 14 and into the first fluid tube. As the engaging member 101 is displaced by the receiving end 15 the spring 125 is compressed between the second stop surface 59 and the hub 104 of the engaging member 101.

Removing endform 14 from the receptacle portion 16 allows the spring 125 to return its relaxed condition. The spring 125 moves the engaging member 101 back into the first position allowing the domed head O-ring 123 to seal against the chamfered surface 57, preventing fluid from entering into fluid passage 25 from second fluid tube 54 and placing valve 100 back in the closed position.

Since the valve 100 and its components reside in coupler 20, the removal and replacement of the coupler 20 from receptacle 16 becomes a matter of forcing latches 30 out of openings 46 and pulling the coupler portion 20 from the receptacle portion 16. By disassembling the coupler 20 from receptacle 16 maintenance can be made to the valve 100 and its components, such as for example, replacement of the O-ring 123. Additionally, the disassembly of the coupler 20 from the receptacle 16 further allows another coupler 20 to be installed to the receptacle 16 having different operating parameters, such as for example, a valve 100 that can operate in fluid systems having higher fluid pressures or fluid temperatures.

Figure 7:
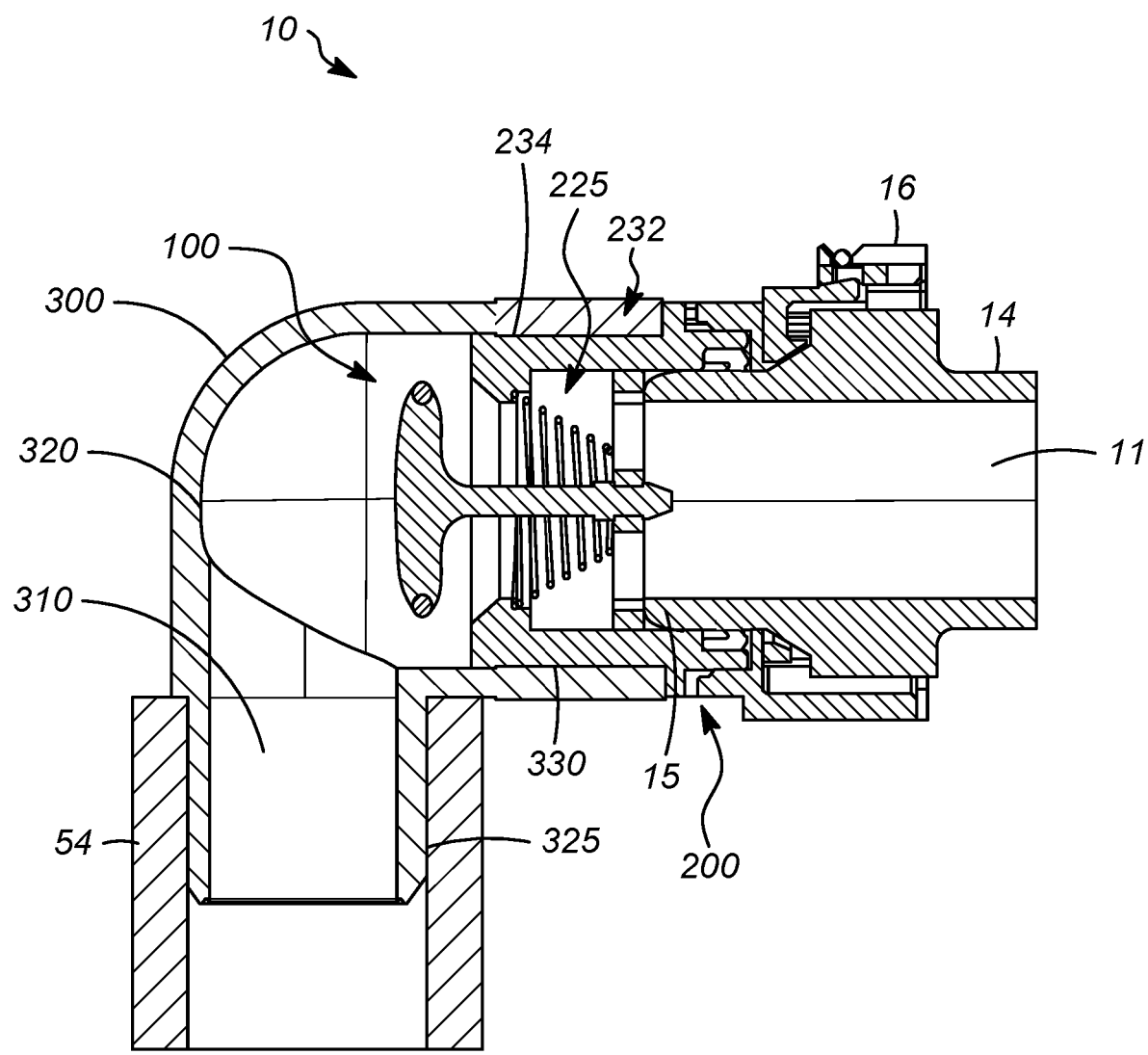
FIG. 7 is a sectional view of a second embodiment of the connector body with an endform installed in the socket cavity of the connector body according to this disclosure.

FIG. 7 illustrates a second embodiment of an example quick connector body 10. The second embodiment includes a receptacle portion 200 adapted to be installed and used with a coupler portion 300 having a male stem 325 oriented 90 degrees to coupler portion 300. The coupler portion 300 is used in installations where the first fluid tube 54 is located 90 degrees to the installed connector body 10 making the installation of the fluid tube 54 difficult or, the installation of the connector body on a fitting extending from a tank or other fluid conveying device that requires a 90 degree installation of the connector body 10.

The fitting 300 includes an internal cylindrical fluid passage 310 having internal walls 320. A stem 325 may have barbed flanges formed on a first end of the fitting 300 as shown in FIGS. 1-6 of the first embodiment. The barbed flanges adapted to be inserted into the internal fluid passage of the second fluid tube 54, retaining the second fluid tube 54 to the fitting 300. Alternatively, male stem 325 may be smooth sided and adapted to be frictionally pressed into the internal surface of a metal tube attached to a fluid tank or other fluid conveying device. A second end of the fitting 300 has a cylindrical interior wall 330 that has an internal diameter to frictionally slip over and engage coupler portion 200 outer wall 234. The valve 100 operates in the same manner with endform 14 installed as described above in FIGS. 5 and 6. The valve 100 is movable between a closed position that blocks or prevents fluid from flowing from fluid passage 310 into passage 225 of coupler portion 200. In the second position as shown in FIG. 7 fluid is allowed to flow between the second fluid tube 54, fluid passage 310 to fluid passage 225 and into fluid passage 11 of endform 14, when the endform 14 is installed and retained in the connector 10.

The components of the valve 100 including the engaging member 101, the stem member 110, and domed head 120 can be constructed as individual components to be assembled together to form the valve 100. The engaging member 101, the stem member 110, and domed head 120 of the valve 100 with the exception of the spring 125 can also be constructed as a unitary structure. In both of the above example embodiments, the components of the valve 100 may be constructed from a metal or resin material or molded from a thermoplastic material such as polyamide or polyphthalamide.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A quick connector for coupling a first fluid tube to a second fluid tube comprising:
    a coupler portion having a fluid passage connected to the first fluid tube the coupler portion having a cylindrical outer surface extending about the periphery of the coupler portion and a plurality of projections and rectangular latches extending obliquely outward from the outer surface;
    a valve mounted within the fluid passage movable between a closed position and an open position;
    an endform formed on an end of the second fluid tube, the endform having a fluid passage; and
    a receptacle portion including a mating end with an annular outer wall extending about the periphery of the mating having a plurality of openings located about the outer wall of the receptacle portion with each opening extending through the outer wall from the exterior to the interior of the outer wall and a plurality of projection receivers spaced equidistant from the other about the periphery of the outer wall and a socket cavity, the socket cavity adapted to receive and retain the endform in the socket cavity causing the valve to move into the open position that allows fluid to flow through the coupler portion fluid passage from the first fluid tube to the endform fluid passage.

2. The quick connector of claim 1, wherein the valve moves to the closed position when the endform is removed from the socket cavity causing fluid to stop flowing through the coupler portion fluid passage from the first fluid tube to the endform fluid passage.

3. The quick connector of claim 1, wherein the coupler portion includes a stem having a plurality of barbed flanges, the barged flanges arranged to be accepted within an inner surface of the first fluid tube retaining and fluidically sealing the first fluid tube to the stem.

4. The quick connector of claim 1, wherein the coupler portion is mated to the receptacle portion by aligning a respective projection with an associated projection receiver and engaging a respective latch with an associated opening latching the receptacle portion to coupler portion.

5. The quick connector of claim 4, wherein the coupler portion is removed from the receptacle portion by forcing each latch out of its respective opening and pulling the coupler portion from the receptacle portion.

6. The quick connector of claim 1, wherein the endform further includes:
    first and a second indexing tabs extending from opposite sides of the endform; and
    the receptacle portion includes a first and a second groove located on opposite sides of receptacle portion,
    wherein first groove is arranged to receive therein the first tab and the second groove is arranged to receive therein the second tab providing alignment of the endform to the receptacle portion when the endform is inserted into the socket cavity.

7. The quick connector of claim 1, wherein the endform further includes a groove extending about the periphery of the endform and the receptacle portion includes a wire retainer including a pair of legs that extend into the socket cavity from opposite sides of the socket cavity, each leg arranged to engage with the endform groove locking the endform to the receptacle portion when the endform is installed in the socket cavity.

8. The quick connector of claim 1, wherein the second fluid tube includes an insertion end and the fluid passage includes a cylindrical bore having an annular groove that holds an elastomeric sealing assembly, the elastomeric sealing assembly deformed by the insertion end fluidically sealing the socket cavity from the fluid passage when the endform is installed into the socket cavity.

9. The quick connector of claim 1, wherein the coupler portion includes:
    an opening to the coupler portion fluid passage having an annular chamfered surface surrounding the opening; and
    the valve including a domed head and a sealing member extending along the external periphery of the domed head and a spring that biases the domed head into the closed position retaining the sealing member against the chamfered surface.

10. The quick connector of claim 9, wherein the coupler portion fluid passage includes a bore stop, the valve further includes:
    an annular engaging member located in the socket cavity movable between a first and a second position; and
    a stem extending axially through the coupler portion fluid passage from the engaging member to the domed head, the spring located circumferentially about the stem between the bore stop and the engaging member,
    wherein in a relaxed condition the spring urges the engaging member into the first position moving the stem and causing the domed head to retain the sealing member against the chamfered surface placing the valve in the closed position.

11. The quick connector of claim 10, wherein the engaging member is movable by the insertion end of the second tube into the second position when the endform is installed in the socket cavity causing the stem to move the domed head and disengage the sealing member from the chamfered surface and compressing the spring, causing the valve to move into the open position allowing fluid to flow through the coupler portion fluid passage from the first fluid tube to the endform fluid passage through the engaging member.

12. The quick connector of claim 11, wherein the spring returns to its relaxed position when the insertion end and the endform are removed from the socket cavity moving the engaging member into the first position and causing the stem to move the domed head to retain the sealing member to the chamfered surface placing the valve in the closed position.

* * * * *